US005699322A

United States Patent [19]

Born

[11] Patent Number: 5,699,322

[45] Date of Patent: Dec. 16, 1997

[54] TIMEPIECE HAVING A POWER RESERVE INDICATOR

[75] Inventor: Jean-Jacques Born, Morges, Switzerland

[73] Assignee: Asulab S.A., Bienne, Switzerland

[21] Appl. No.: 694,195

[22] Filed: Aug. 8, 1996

[30] Foreign Application Priority Data

Aug. 10, 1995 [CH] Switzerland .................... 02 298/95-4

[51] Int. Cl.[6] ................................ H02P 9/04; G04B 9/00

[52] U.S. Cl. ........................... 368/66; 368/140; 368/155; 368/203; 322/29

[58] Field of Search ............................. 368/66, 140, 155, 368/157, 203

[56] References Cited

U.S. PATENT DOCUMENTS

| | | | |
|---|---|---|---|
| 2,698,066 | 12/1954 | Favret | 368/66 |
| 5,517,469 | 5/1996 | Wiget | 368/140 |

FOREIGN PATENT DOCUMENTS

| | | |
|---|---|---|
| 3226558 | 1/1984 | Germany . |
| 3442862 | 5/1986 | Germany . |
| 4041696 | 3/1992 | Germany . |
| 2076568 | 12/1981 | United Kingdom . |

OTHER PUBLICATIONS

Patent Abstracts of Japan, vol. 2, No. 77 (E-78) Jun. 17, 1978 —JP-A-53 042777 (Daini Seikosha K.K.) Apr. 18, 1978.

Patent Abstracts of Japan, vol. 5, No. 150 (P-81), Sep. 22, 1981 —JP-A-56 081472 (Daini Seikosha K.K.).

Patent Abstracts of Japan, vol. 10, No. 271 (P-497), Sep. 16, 1986 —JP-A-61 095272 (Seiko Epson Corp.).

Patent Abstracts of Japan, vol. 8, No. 242 (P-311), Nov. 7, 1984 —JP-A-59 116078 (Suwa Seikosha K.K.).

*Primary Examiner*—Bernard Roskoski
*Attorney, Agent, or Firm*—Sughrue, Mion, Zinn, Macpeak & Seas, PLLC

[57] ABSTRACT

This timepiece comprises a barrel (1), a spring (1*a*), hands (5) and an electric energy generator (2) intended to provide, by way of a rectifier (4) a continuous voltage to a regulating circuit (6). This regulating circuit controls the speed of the generator in such a way so as to impose to the hands a rotational speed which corresponds to a correct indication of the current time. The regulating circuit comprises a transistor (10) for short-circuiting the generator and for braking it when said regulating circuit observes that the generator is rotating at a speed which is too large to ensure a correct indication of the time.

Means (13 to 17) are provided for counting the number of times that the generator is braked during periods of predetermined duration and means for providing, as a function of the result of this counting, a visual indication of the power reserve.

7 Claims, 3 Drawing Sheets

TIMEPIECE HAVING A POWER RESERVE INDICATOR

The present invention relates to a device for indicating the power reserve of an electronic timepiece.

More specifically, the invention concerns such a device for an electronic timepiece in which the electric energy is generated by a generator driven by a winding barrel spring mechanism.

For a long time mechanical watches have been known which are provided with a device for indicating the power reserve which functions generally in a differential manner and which is coupled to the winding device as well as the barrel containing the spring of the watch, which is the energy source for running such a watch. The indicating organ of such a device is then driven in a sense of direction during the winding of the barrel and in the other sense of direction when the spring unwinds thus causing the watch to move.

Such a device far indicating the power reserve could be used in an electronic timepiece comprising an electric energy generator coupled to a winding barrel spring mechanism and intended to supply an electronic time keeping circuit which is regulated by a quartz oscillator.

However, for such an application, in view of the fact of the presence of electronic means, the classical mechanism for indicating the reserve may seem complex and large, whereas the electronic circuit allows to simplify considerably the indication of the power reserve.

An aim of the invention is to propose a simple and efficient solution within this framework for indicating in an irreproachable manner and in a clear way the power reserve of an electronic timepiece which gets its electric energy from a generator driven by a winding spring of a barrel, this generator further serving to regulate the running of the timepiece.

The invention has thus for its object a timepiece comprising a barrel, a spring contained in this barrel, time display organs Mechanically coupled to said barrel, an electric energy generator also mechanically coupled to said barrel and intended to provide an alternating voltage, a rectifier connected to said generator for providing a continuous voltage from said alternating voltage, and a regulating circuit fed by said continuous voltage and intended to regulate the speed of said generator in such a way as to impose to said display organs a rotational speed which corresponds to a correct indication of the current time, said regulating circuit comprising to this effect a switching organ capable of short-circuiting said generator and of braking it when said regulating circuit observes that said generator rotates at a speed larger than that at which it should turn for ensuring a correct indication of the time, said timepiece being characterized in that it further comprises a device for indicating the power reserve which comprises means for fixing successive periods of time of a predetermined duration, means for counting, during each of said periods, the number of times that said generator is braked by said switching organ, and display means for providing, as a function of the result of this counting, a visual indication of the power reserve.

Other features and advantages of the invention will appear during the description will follows given solely by way of example and made with reference to the attached drawings in which.

Figure 1:
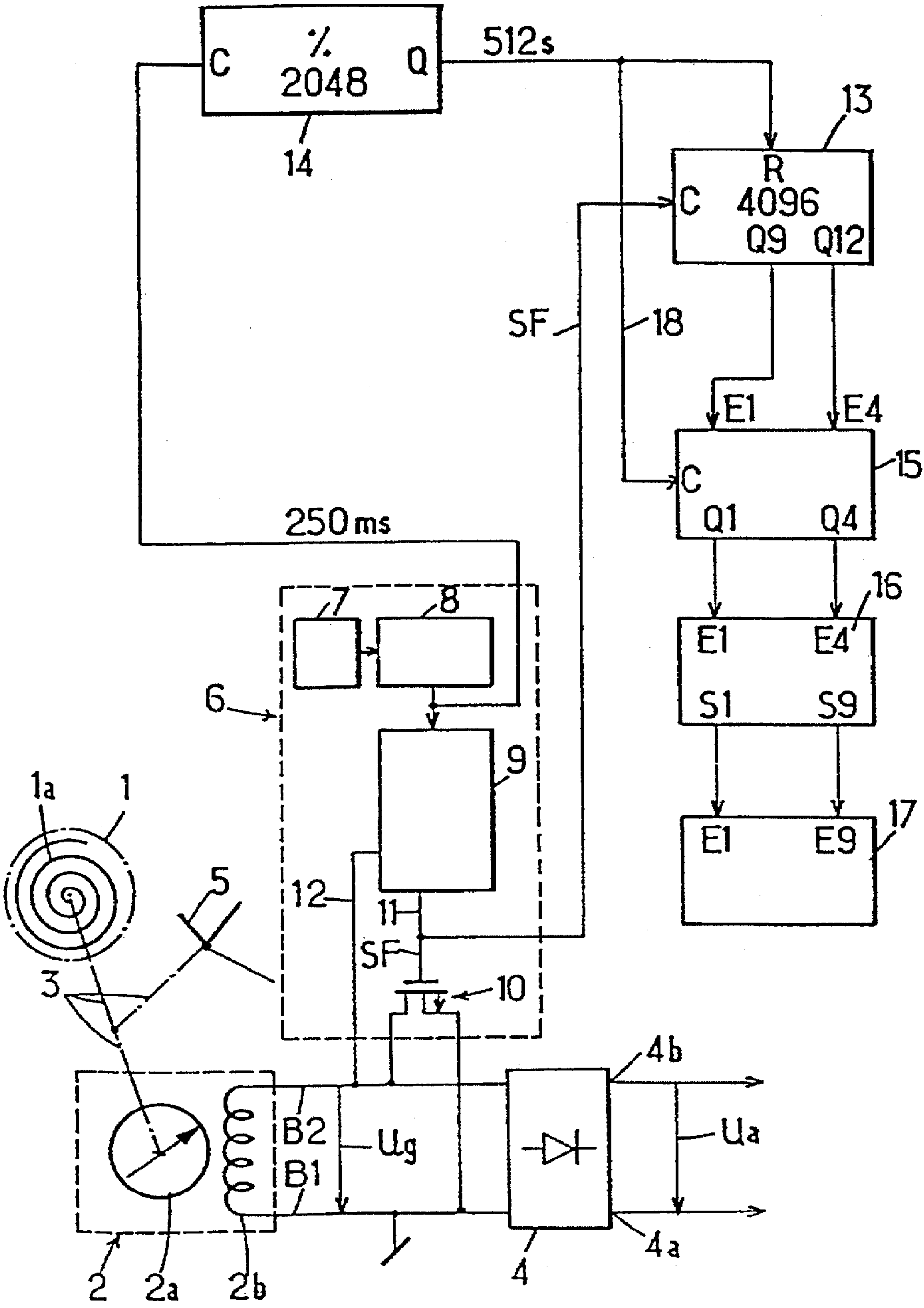
FIG. 1 shows a general simplified scheme of a timepiece according to the invention.

Reference will now be made to FIG. 1 which represents a general simplified scheme of a timepiece according to the invention. It is to be noted that a part of the scheme concerning the regulating circuit intended to control the rotational speed of the generator of this timepiece will not be described in detail here, as the skilled person may readily conceive this controlling device by referring to the description of the Swiss patent application CH 686 332 in the name of the applicant of the present application. However, so as to facilitate the comprehension of the present invention, the essential elements of the scheme and the functioning of this regulating circuit will be recalled briefly.

The timepiece provided with the device for indicating the power reserve according to the invention comprises a mechanical energy source formed by a barrel 1 containing a spring **1*a*** of the type which is usual in watch technology, and which may be wound mechanically or automatically.

Barrel 1 is mechanically coupled to rotor **2*a* of an electric generator 2 by the intermediate of a gear train 3** symbolised by dotted lines.

Generator 2 comprises a coil **2*b* which generates at its terminals B1 and B2 an alternating voltage Ug, when rotor 2*a* is rotationally driven, this rotor being the carrier of a permanent magnet generating a magnetic field symbolised by an arrow in FIG. 1 and which is coupled to coil 2*b***.

Terminals B1 and B2 of coil **2*b* are connected to a rectifier 4 the output terminals 4*a* and 4*b*** of which provide a continuous voltage Ua obtained from the alternating voltage Ug and intended to supply the several electronic circuits of the timepiece.

Hands 5 or any other classical mechanical displaying means of the time, are coupled to the gear train 3 so as to allow the display of the current time and possibly also the date and the day or another time information.

The rotational speed of hands 5 is kept to a constant average value thanks to a regulating circuit 6 which regulates this value to a reference speed Vc.

As is described in the patent application cited herebefore, the components of regulating circuit 6 are realised so as to regulate the rotational speed of rotor **2*a* in such a way that hands 5** rotate at the speed which is required to correctly indicate the time when the rotor rotates at the reference speed Vc. This speed being for example four rotations per second.

Regulating circuit 6 comprises an oscillator 7 stabilised by a quartz of the horologic type and a frequency divider 8 for bringing the frequency of this quartz to a value which is usable by a functional block 9 which controls the grid of a semiconductor component 10, for example a n-type MOS transistor.

The latter is connected by way of its principal circuit to the terminals B1 and B2 of coil **2*b* of generator 2. Consequently, when this semiconductor component is conducting, it allows to short-circuit this coil and thus to obtain a braking effect of the rotational movement of generator 2**.

The constructional features as well as the functional features of the several elements described hereabove are realised in such a way that:

a) the average rotational speed of rotor **2*a* is larger than the reference speed Vc, as long as barrel spring 1*a* is not almost completely unwound under the condition that coil 2*b* is not short-circuited by the semiconductor component 10, and that b) this average rotational speed is less than the reference speed Vc, if coil 2b is short-circuited and this even when the barrel spring 1a** is completely wound and the torque it provides has a maximum value.

It should further be noted that within the framework of the present invention, the elements and the functioning described briefly hereabove may possibly be obtained in other ways than that described in the patent application cited hereabove, provided that the rotational speed of the generator is correctly regulated as indicated hereabove. This regulation should thus be made as a function of the required reference speed Vc (which is determined by the correct indication of the time by hands 5) by the intermediate of successive braking operations of the generator 2 due to a repetitive short-circuiting of coil 2b of this generator.

The control braking signal SF which flows through a conductor line 11 between the functional block 9 and the grid of the semiconductor component 10 is of the logical type and in the example represented, it will be assumed that this signal has the logical state "0" when the timepiece is slow, i.e. when the average speed of rotor 2a is less than the reference speed Vc. Under these conditions, component or transistor 10 remains in the off-state and rotor 2a will not be braked.

On the contrary, when the timepiece runs too fast or when the average speed of rotor 2a is larger than the reference speed Vc, the control braking signal SF is formed of pulses having a fixed length which start at the beginning of each alternance, for example the positive one, of the voltage Ug at terminals B1 and B2 of coil 2b. During each of these pulses of control signal SF, this signal is in the state "1" thus rendering transistor 10 conducting and braking rotor 2a.

The information concerning the alternating voltage Ug provided at terminals B1 and B2 of coil 2b is led to the functional block 9 by the intermediate of a conductor line 12.

The invention is based on the observation that the braking signal SF flowing through conductor 11, otherwise said the frequency with which rotor 2a is braked, constitutes a measure of the winding state of spring 1. In fact, when the barrel spring is complete wound, that is when the power reserve is at its maximum, the torque it produces is maximum. Under these conditions, the rotor will have a permanent tendency to rotate at a speed which is larger than the reference speed Vc and it will thus have to be braked at the beginning of each period of voltage Ug.

During the unwinding of barrel spring 1a, the motor torque which it provides will diminish progressively so that the rotor will have to be braked less frequently and that gradually its speed will be less often larger than the reference speed Vc, until the moment that it will not have to be braked any more. This thus indicates that the power reserve has been used up and the timepiece will stop if the user does not wind spring 1a.

According to the invention, the device for indicating the power reserve thus comprises means which count the successive braking operations during successive periods of time which are of a predetermined length and which develop a display signal from the number of braking operations which occur during these successive periods of time. An example of an embodiment of these means will be described now in more detail.

Conductor 11 of functional block 9 which transmits the control braking signal SF to transistor 10, is connected to a counter 13 which is provided to count the number of pulses of this signal. Its counting input C is thus connected to conductor 11. Its zero-reset input R is connected to the output Q of a frequency divider 14 which fixes the successive time periods of a predetermined duration. In this example, the input of this divide 14 is connected to the output of frequency divider 8 in such a way so as to further divide the output frequency of the latter.

A memory 15, formed for example by a classical latch circuit, is connected by its inputs E1 to E4 to several respective outputs, here the outputs Q9 to Q12, of counter 13. The clock input C of this memory is connected to the output Q of frequency divider 14. The outputs Q1 to Q4 of memory 15 are respectively connected to inputs E1 to E4 of a decoder 16 the outputs of which, here S1 to S9, are respectively connected to inputs E1 to E9 of displaying means or display 17.

In the example considered, which is in no way limitative, the output signal of frequency divider 8 has a period of 250 ms. The division ratio of frequency divider 14 is 2048, which thus creates every 512 seconds a pulse at its output (see FIG. 2). This signal thus sets the predetermined time period during which the number of times that transistor 10 short-circuits coil 2b is counted.

When assuming that rotor 2a rotates too fast with respect to the reference speed Vc during the total duration of the counting period and is braked at the beginning of each period of voltage Ug (this means that the spring only just begins to unwind), the number of pulses of control signal SF will be superior to 2048. Due to this, counter 13 must have a greater capacity and needs an extra flip-flop which thus gives this counter a minimum necessary capacity of 4096.

Figure 2:
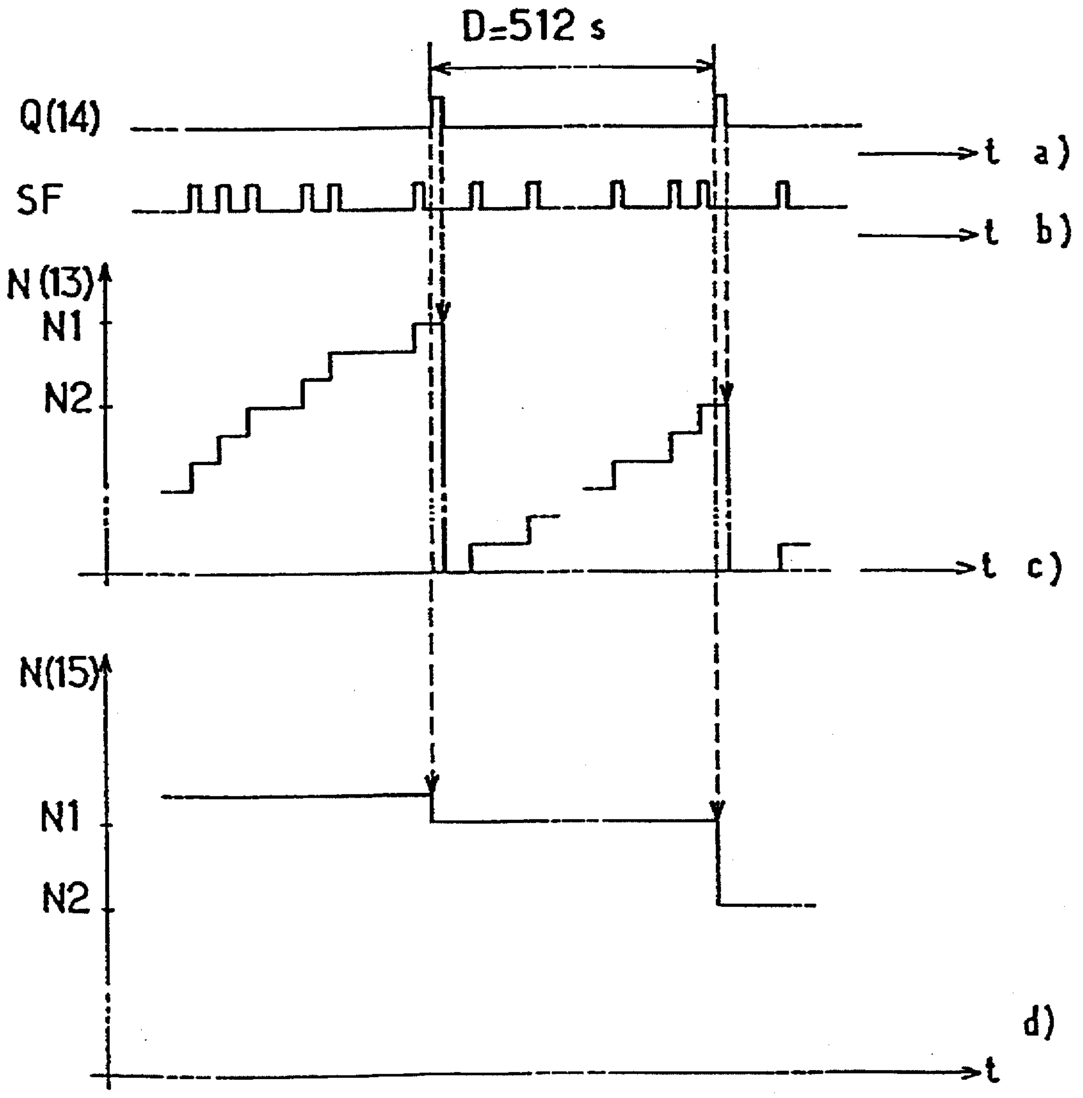
FIG. 2 is a time diagram illustrating the functioning of the timepiece according to the invention.
Figure 3A:
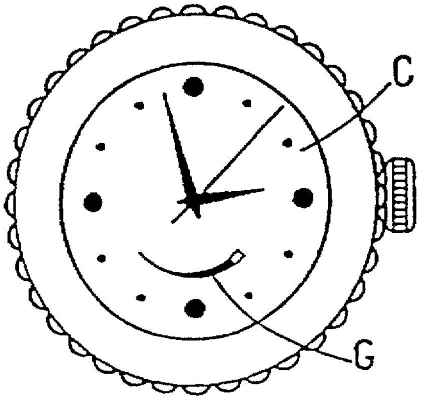
FIG. 3*a* to 3*f* show several alternatives of displaying devices which may be used in a timepiece according to the present invention.
Figure 3B:
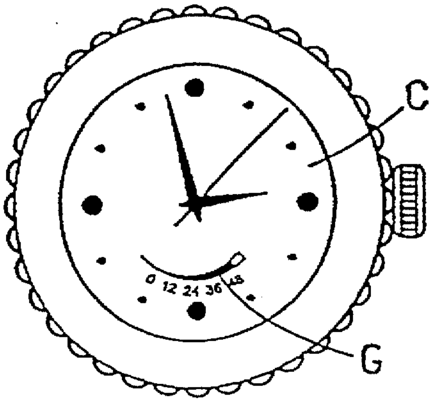
Figure 3C:
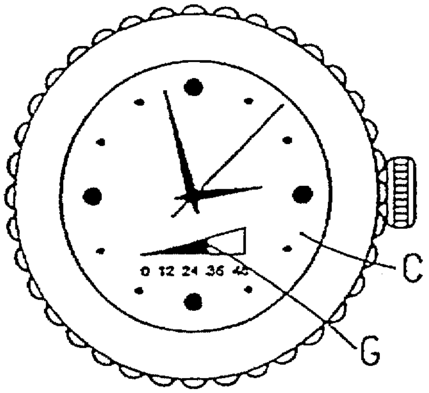
Figure 3D:
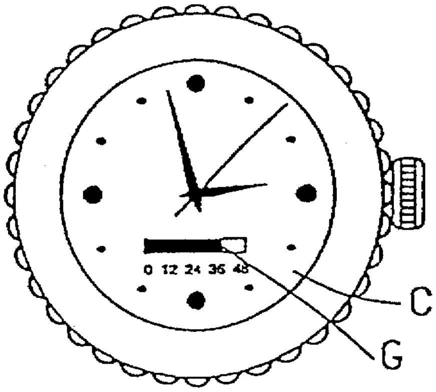
Figure 3E:
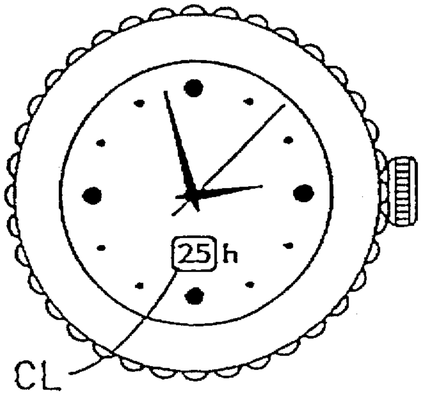
Figure 3F:
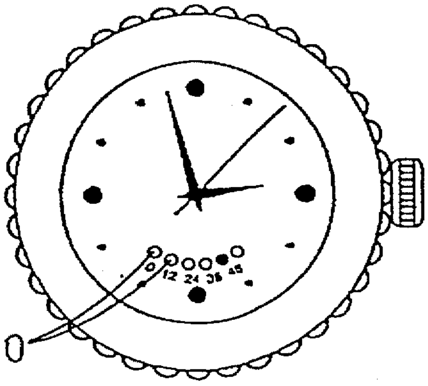

FIG. 2 illustrates byway of a diagram representing several important signals as a function of time, the way in which the device for indicating the power reserve described herebefore functions.

Curve a) shows the output signal of frequency divider 14. This signal presents a period of duration D, chosen here as being equal to 512 seconds.

Curve b) shows the signal SF applied to the counting input of counter 13, it being understood that this figure shows in an illustrative manner two counting periods which are relatively spaced apart and during which the number of pulses of each period are different one from the other. As such two phases of functioning are taken into consideration during which the winding of the spring is respectively strong or weak.

Curve c) represents the contents of counter 13 during the two represented respective periods, while curve d) shows the output of memory 15 which conserves each time the information of the preceding counting period and which is reset to zero at the end of each counting period thanks to a reset signal which transits along a conductor 18 (FIG. 1).

FIGS. 3(*a*) to 3(*f*) show several examples of practical embodiments of displaying means 17. The figure represents in a), b), c) and d)) displays indicating the instantaneous value of the output of memory 15 respectively by a non-graduated indication (a) or a graduated indication having, for example, 12 hour intervals (b), c) and d)). As may be understood, the ways in which these displaying devices may be obtained are numerous and the skilled person will readily know how to conceive such. For example, dial C of the timepiece may comprise an aperture G behind which a coloured strip moves which is animatedby a small actuator (non represented) receiving its control signal from decoder 16. As an alternative, a series of luminescent diodes may be used.

In e) and f) of FIG. 3, two other alternatives have been represented, one comprising a liquid crystal display CL visualising the power reserve in hours, and the other comprising several apertures O forming a scale which is graduated in periods of 12 hours for example. A luminescent diode may be provided behind each of said apertures and being controlled in a suitable manner by the output of decoder 16.

The resolution of display 17 is irrelative, and may be for example in periods of a predetermined number of hours, as represented in b), c), d) and f) of FIG. 3, in hour units as in e), or even by all or nothing requiring a sole indicator, an alternative which has not been represented in the drawings. The skilled person may readily adapt memory 15, decoder 16 and display 17 to these several different possibilities of displaying which all remain within the framework of this invention.

In particular, it is obvious that an increase of the resolution goes together with an increase of the capacity of memory 15.

However, as has been explained hereabove, it is also possible to realise the elements and the functions in a different manner than that described in the Swiss patent application CH 686 332 cited herebefore. Thus, it may be understood that in analogy it is also possible, thereby still remaining within the framework in the present invention, to measure the duration between each occurrence of a braking pulse SC so as to determine the power reserve, instead of counting this number of pulses during a fixed predetermined duration as has been explained herebefore. In this case, the power reserve is large when the duration between two successive pulses is short, i.e. when braking must be performed often, and the reserve is small when this duration is long.

It is also possible that memory 15 only memorises a certain number of the most significant bits of the output information of counter 13, for example the four most significant bits, as is represented in FIG. 1. Under these conditions, it is theorically possible to display sixteen distinct informations on display 17. This is generally considered as being redundant for the envisaged aim, a number of information of at most nine should suffice for usefully informing the user of a timepiece of its power reserve state.

It should further be noted that the device according to the invention may, to a certain extent, inform the user of the mechanical state of the timepiece. For example, if display 17 cannot reach the maximum reserve graduation, although the user has completely wound the spring, this could mean for example that the timepiece requires a revision and a new greasing.

What is claimed is:

1. A timepiece comprising a barrel, a spring contained in this barrel, time display organs mechanically coupled to said barrel, an electric energy generator also mechanically coupled to said barrel and intended to provide an alternating voltage, a rectifier connected to said generator for providing a continuous voltage from said alternating voltage, and a regulating circuit fed by said continuous voltage and intended to regulate the speed of said generator in such a way as to impose to said display organs a rotational speed which corresponds to a correct indication of the current time, said regulating circuit comprising to this effect a switching organ capable of short-circuiting said generator and of braking it when said regulating circuit observes that said generator rotates at a speed larger than that at which it should turn for ensuring a correct indication of the time, wherein said timepiece further comprises a device for indicating the power reserve which comprises means for fixing successive periods of time of a predetermined duration, means for counting, during each of said periods, the number of times that said generator is braked by said switching organ, and display means for providing, as a function of the result of this counting, a visual indication of the power reserve.

2. A timepiece according to claim 1, wherein said regulating circuit comprises a horological quartz oscillator and a first frequency divider, said means for fixing said time period of a predetermined duration comprises a supplemental frequency divider connected to the output of said first divider.

3. A timepiece according to claim 1, in which said generator comprises a coil and said switching organ is a semi-conductor component connected by way of its principal circuit to the terminals of said coil of said generator in such a way that it may short-circuit said coil, this being controlled by said regulating circuit, and wherein said means for counting comprises a counter connected to the control grid of said component for counting the number of times that this component short-circuits said coil during said predetermined duration.

4. A timepiece according to claim 3, wherein said counter is connected to a memorising circuit which memorises the state of said counter during each of said predetermined periods.

5. A timepiece according to claim 1, wherein said displaying means are arranged for providing an hour-graduated information or a multiple hour-graduation information on a dial of said timepiece.

6. A timepiece comprising a barrel, a spring contained in this barrel, time display organs mechanically coupled to said barrel, an electric energy generator also mechanically coupled to said barrel and intended to provide an alternating voltage, a rectifier connected to said generator for providing a continuous voltage from said alternating voltage, and a regulating circuit fed by said continuous voltage and intended to regulate the speed of said generator in such a way as to impose to said display organs a rotational speed which corresponds to a correct indication of the current time, said regulating circuit comprising to this effect a switching organ capable of short-circuiting said generator and of braking it when said regulating circuit observes that said generator rotates at a speed larger than that at which it should turn for ensuring a correct indication of the time, wherein said timepiece further comprises a device for indicating the power reserve which comprises means for counting the number of times that said generator is braked by said switching organ, means for measuring the duration of the time between each braking operation, and display means for providing, as a function of the result of this time duration measurement, a visual indication of the power reserve.

7. A timepiece according to claim 6, wherein said displaying means are arranged for providing an hour-graduated information or a multiple hour-graduation information on a dial of said timepiece.

* * * * *